July 22, 1930.

W. KIWI

MACHINE FOR FORMING AND ATTACHING WIRE COILS

Re. 17,744

Original Filed Aug. 24, 1926 4 Sheets-Sheet 1

Inventor
Walter Kiwi

By William J. Jackson
Attorney

July 22, 1930. W. KIWI Re. 17,744
MACHINE FOR FORMING AND ATTACHING WIRE COILS
Original Filed Aug. 24, 1926 4 Sheets-Sheet 2
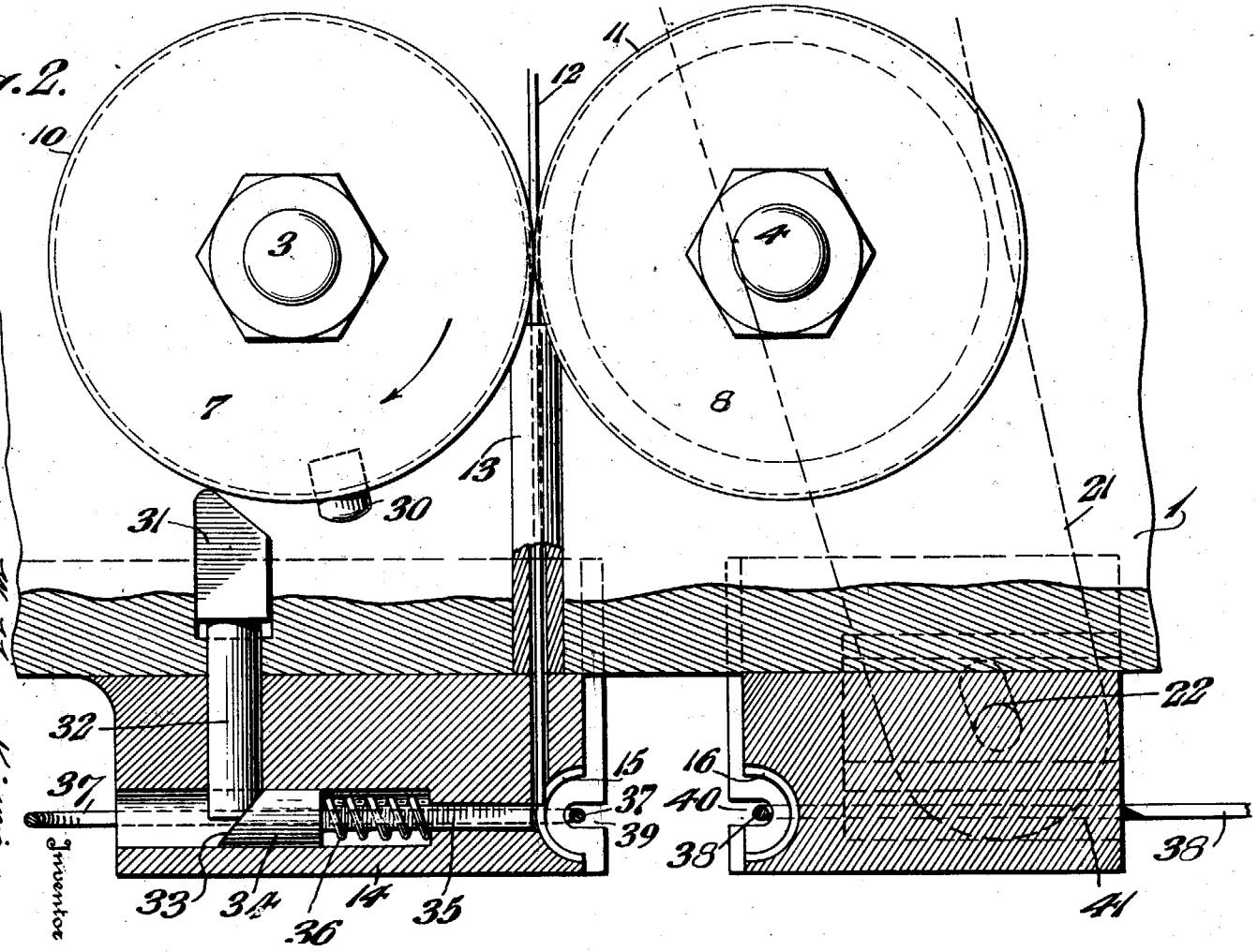

W. KIWI
July 22, 1930. MACHINE FOR FORMING AND ATTACHING WIRE COILS Re. 17,744
4 Sheets-Sheet 3
Original Filed Aug. 24, 1926
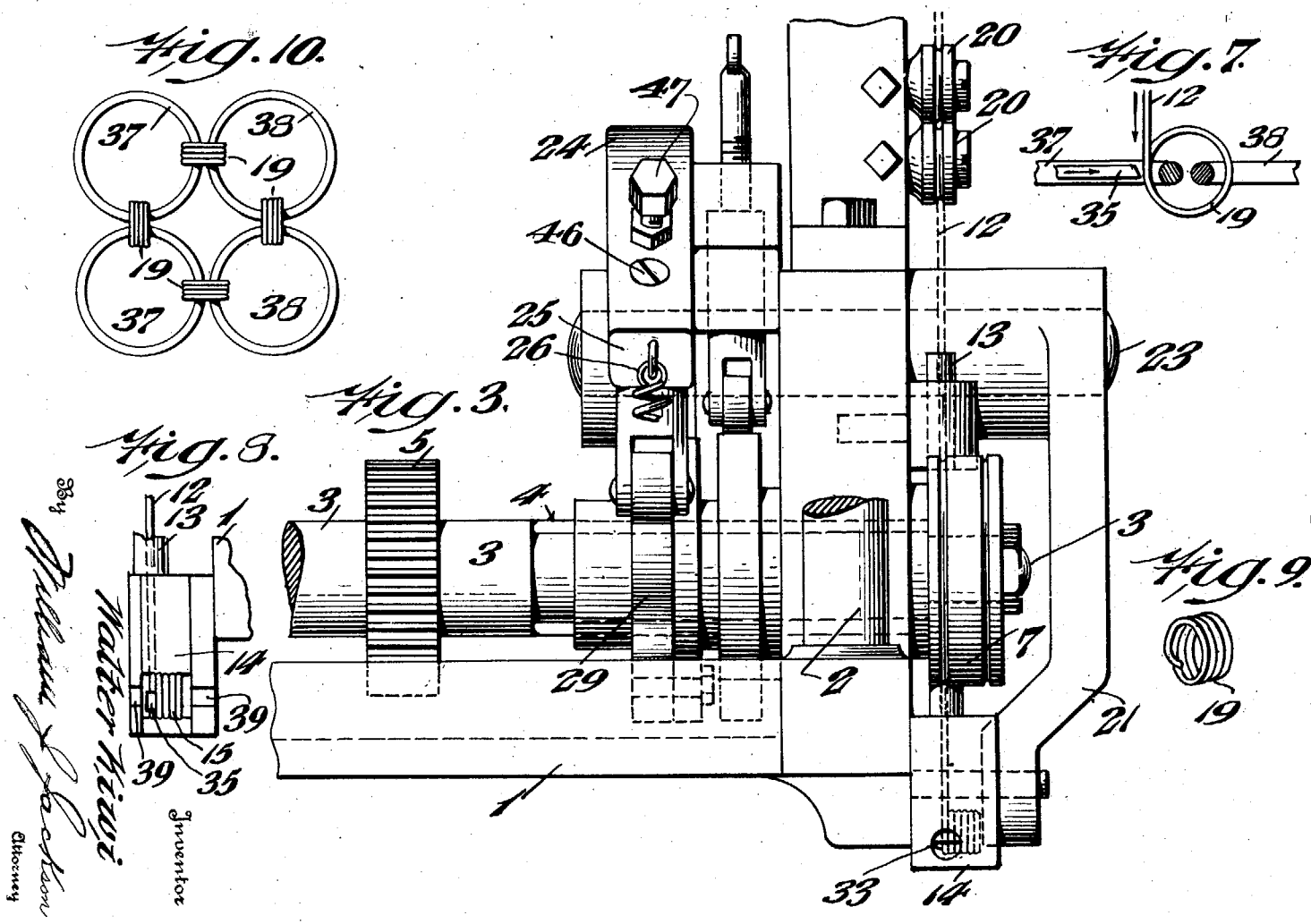

July 22, 1930. W. KIWI Re. 17,744
MACHINE FOR FORMING AND ATTACHING WIRE COILS
Filed Aug. 24, 1926
Original Filed Aug. 24, 1926 4 Sheets-Sheet 4
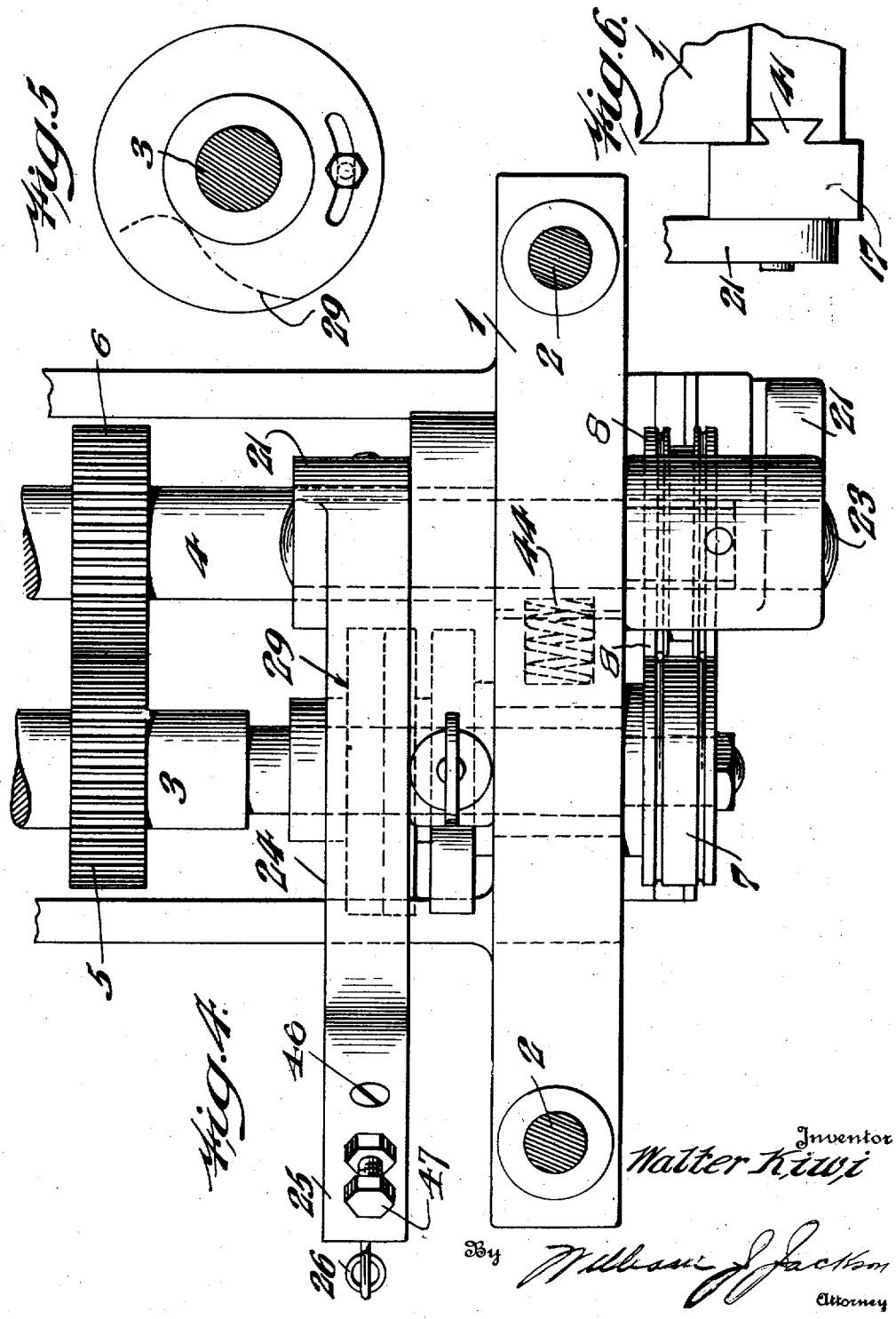

Reissued July 22, 1930 Re. 17,744

UNITED STATES PATENT OFFICE

WALTER KIWI, OF PHILADELPHIA, PENNSYLVANIA, ASSIGNOR, BY MESNE ASSIGNMENTS, TO PEERLESS SPRINGS, INC., OF WEST CHESTER, PENNSYLVANIA, A CORPORATION OF PENNSYLVANIA

MACHINE FOR FORMING AND ATTACHING WIRE COILS

Original No. 1,649,600, dated November 15, 1927, Serial No. 131,206, filed August 24, 1926. Application for reissue filed June 11, 1929. Serial No. 370,018.

This invention, stated in its broadest terms, relates to wire winding machinery of the automatic type and has more especial relation to machinery of this type in which small coils of wire are formed and simultaneously secured between adjacent coiled springs for holding the latter together.

The invention consists of the novel construction hereinafter described and finally claimed.

The nature, characteristic features and scope of the invention will be more fully understood from the following description taken in connection with the accompanying drawings forming part hereof, and in which:

Fig. 2, is a front view, upon an enlarged scale and partly sectioned, of certain of the parts shown in Fig. 1.

Fig. 3, is a view in side elevation of Fig. 1.

Fig. 4, is a plan view thereof.

Fig. 5, is a face view of the double cam shown at the left hand side of Fig. 1.

Fig. 6, is a view showing in end elevation the dovetail fit of the sliding jaw.

Fig. 7, is a front diagrammatic view illustrating the manner of coiling wire around a pair of coiled springs.

Fig. 8, shows the same parts in end elevation.

Fig. 9, is a view in perspective of a finished, detached coil; and

Fig. 10, is a view in plan of several coiled springs secured together by said wires.

Figure 1:
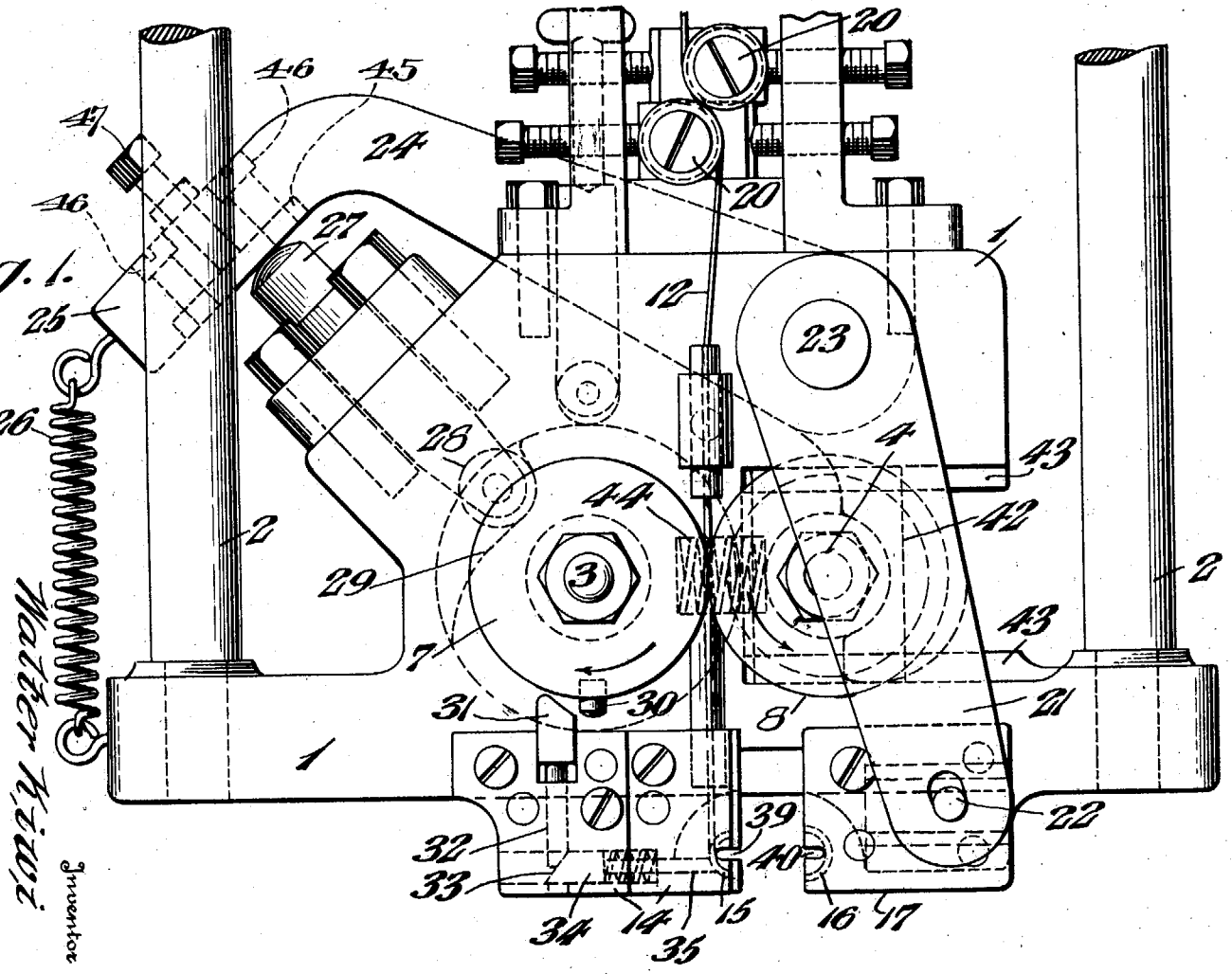
Fig. 1, is a view in front elevation of machine parts embodying the invention.

In the drawings, 1 designates a frame which may be supported in any way, as for instance suspended by rods 2 from the ceiling. Rotatably supported in frame 1 is the main driving shaft 3 and paralleling the same is the secondary shaft 4. The shafts are rotatable in unison meshing gear wheels 5 and 6 being provided for the purpose. Shaft 3 may be driven by any suitable source of power forming no part of the present invention and for this reason has not been illustrated. Each of the shafts 3 and 4 is equipped with a feed roller, the same being designated 7 and 8 respectively. These rollers are grooved annularly at 10 and 11 for wire accommodation and in rotation feed the wire 12 through a fixed guide 13 directly to a stationary jaw 14, see Fig. 2. This fixed jaw is provided with a wire gauge of semi-circular contour and designated 15, the gauge being provided with a series of grooves best seen in Fig. 8. These grooves align with similar grooves of a wire gauge 16 of a movable jaw 17 so that when the jaw 17 is shifted to the left in Fig. 2 the two gauges abut and the grooves form complete spirals. Thus, as the guide rollers 7—8 feed wire 12 to the meeting gauge parts the wire is forced around inside the same to form a coil 19, as seen in Fig. 9. As the wire 12 is fed through the rollers 7—8 it may, if found desirable, strain out the wire prior to being fed through the said rollers by means of straining rollers 20, see Figs. 1 and 3. These straining rollers 20 form no part of the present invention and may be positioned in any desired place, for instance: upon the frame 1 as shown in the drawings. The shiftable jaw 17 is moved to the left in Fig. 2 by means of a lever 21 having slot and pin connection as at 22 with the shiftable jaw 17, said lever 21 being mounted upon a rock shaft 23 carried by frame 1. This rock-shaft also carries an arm 24 provided with an extension 25. The extension 25 is connected with the frame 1 by means of a coiled spring 26, which spring tends to keep the shiftable jaw 17 moved to the right in Fig 1. The extension 25 is operated upon by means of a shiftable pin 27, see Fig. 1, which pin carries at its lower end a roller 28 adapted to track upon a cam 29. This cam 29 is carried by driving shaft 3 and in the rotation of the cam 29 in the direction of the arrow in Fig. 1, the pin 27 is pressed outward thus moving extension 25 of arm 24 upwardly against the action of spring 26, thus shifting lever 21 and the movable jaw 17 to the left in Fig. 1 so that the gauge 16 of jaw 17 abuts against gauge 15 of fixed jaw 14. Obviously as the cam operating surface of cam 29 is moved away from the roller 28 of pin 27, the spring 26 causes the extension 25, arm 24, lever 21, and jaw 17 to move to normal position. The extension 25 shown at the left hand side of Fig. 1 is provided with a bearing plate 45 against which the cam actuated pin 27 abuts. Set screws 46 and an adjusting screw 47 are provided this bearing plate in order that the plate may be properly positioned and locked to place.

Referring now particularly to Fig. 2, a description will be given of the knife and its mechanism which operate to cut a finished coil of wire. The feed roller 7 is provided with a pin 30 having a rounded end which pin 30 in the rotation of the feed roller 7 is adapted to contact with the inclined surface of the head 31 of a vertically arranged pin 32. This pin 32 upon being depressed exerts pressure upon the inclined surface 33 of a horizontally disposed member 34 which carries a longitudinally extended cutter 35, the outer end or cutting edge of which cutter 35 normally is substantially flush with the innermost portion of the gauge 15, as clearly illustrated at the left hand side of Fig. 2. The cutter 35 is mounted in this normal position by means of the spring 36. Thus, as the feed rollers 7 and 8 feed wire 12 of the gauges 15 and 16 the wire is coiled in said gauges in the fashion shown in Fig. 7 around a pair of adjacent coiled springs 37—38. As the coils 19, previously described, are thus formed, the feed roller 7 has proportionately advanced so that the stud 30 depresses head 31 and the pin 32 and shifts member 34 to the right to cause the cutter 35 to sever the coil 19, as formed from the remainder of the wire 12. This operation is repeated and repeated until the required number of springs 37 and 38 are secured together by wire coils 19, an illustration of which is shown in Fig. 10. It may be stated that the jaw 14 is provided with opposed slots 39, see Fig. 8, and the jaw 17 is provided with similar slots 40, which slots are used as guides for presenting springs 37—38 to the gauges 15—16. The slidable jaw 17, as shown in Figs. 2 and 6, is provided with a dovetailed connection with respect to the frame 1.

The bearing 42 which supports shaft 4 is mounted in ways 43 in frame 1 and the bearing 42 has cushioned relation as at 44 with the frame 1, see Fig. 1. This is so that the feed roller 8 is free to move to the right or left in Fig. 1 to take care of any inequalities in the wire 12 and thereby prevent jamming of feed roller parts.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. In a machine of the character stated, wire feeding rolls, a fixed part-ring forming gauge, a companion part-ring forming gauge movable longitudinally toward the fixed gauge movable longitudinally toward the fixed gauge to abutting relation, means for feeding wire through said rolls to said meeting gauges for a pre-determined length of wire, a cutter, and means carried by one of said feed rolls for operating said cutter to sever said wire after the proper length thereof has been fed to said meeting gauges to form a spiral coil.

2. In a machine of the character stated, wire feeding rolls, a fixed part-ring forming gauge having a spiral groove therein, a companion part-ring forming gauge having a spiral groove therein movable longitudinally toward the fixed gauge to abutting relation, means for feeding wire through said rolls to said meeting gauges for a pre-determined length of wire, a cutter, and means carried by one of said feed rolls for operating said cutter to sever said wire after the proper length thereof has been fed to said meeting gauges to form a spiral coil.

3. In a machine of the character stated, wire feeding rolls, a fixed part-ring forming gauge, a companion part-ring forming gauge movable longitudinally toward the fixed gauge to abutting relation said gauges each having a longitudinally extended U-shaped slot therein to accommodate a coiled spring, means for feeding wire through said rolls to said meeting gauges for a pre-determined length of wire, a cutter, and means carried by one of said feed rolls for operating said cutter to sever said wire after the proper length thereof has been fed to said meeting gauges to form a spiral coil.

4. In a device of the character stated, wire feeding rolls, a fixed part-ring forming gauge, a companion part-ring forming gauge movable longitudinally toward the fixed gauge to abutting relation, means for feeding wire through said rolls to said meeting gauges for a pre-determined length of wire, a cutter and means including a fixed pin carried by one of said feed rolls for operating said cutter to sever said wire after the proper length thereof has been fed to said meeting gauges to form a spiral coil.

5. In a machine of the character stated, wire feeding rolls, a fixed part-ring forming gauge, a companion part-ring forming gauge movable longitudinally toward the fixed gauge to abutting relation, means for feeding wire through said rolls to said meeting gauges for a pre-determined length of wire, a longitudinally disposed cutter, and means carried by one of said feed rolls for operating said cutter to sever said wire after the proper length thereof has been fed to said meeting gauges to form a spiral coil.

6. In a machine of the character stated, wire feeding rolls, a fixed part-ring forming gauge, a companion part-ring forming gauge movable longitudinally toward the fixed gauge to abutting relation, means for feeding wire through said rolls to said meeting gauges for a pre-determined length of wire, a cutter, and means carried by one of said feed rolls including cam mechanism, for operating said cutter to sever said wire after the proper length thereof has been fed to said meeting gauges to form a spiral coil.

7. In combination, a hollow cylindrical wire gauge formed in two parts, means for securing separating relative movement between the two parts of the gauge to admit elements to be joined to the space defined by the gauge, and for securing closing relative movement of the two parts to cause the gauge to embrace such elements, and means for feeding wire to the inner periphery of the gauge whereby a spiral coil is formed about such elements.

8. In combination, a coil forming gauge including two relatively movable parts, means for securing relative movement of the parts to admit adjacent elements of a pair of coil springs, means for supporting the adjacent elements within the gauge in spaced relation to the inner periphery thereof, and means for forcing wire into the gauge in the space between the adjacent elements of the coil springs and the inner periphery, whereby a spiral coil is formed loosely embracing the said elements.

9. In combination, a hollow cylindrical wire forming gauge, a wall at each end of the gauge each having slots terminating clear of the periphery of the gauge and extending diametrically across the ends of the gauge, means enabling the introduction of elements of adjacent coil springs into said slots whereby said elements are supported in spaced relation to the inner surface of the gauge, and means for axially extending wire for a predetermined length tangentially into the gauge so that a closed coil is formed embracing the said elements, and the first mentioned means arranged to permit the withdrawal of the connected coil spring elements from the slots of the end walls.

WALTER KIWI.